March 17, 1942.  R. G. HAWKER  2,276,771
FLUSH VALVE SEAT FORMING TOOL
Filed May 29, 1936  2 Sheets-Sheet 1

Inventor
Roland G. Hawker
By  L. Walker
Attorney

March 17, 1942.  R. G. HAWKER  2,276,771
FLUSH VALVE SEAT FORMING TOOL
Filed May 29, 1936  2 Sheets-Sheet 2
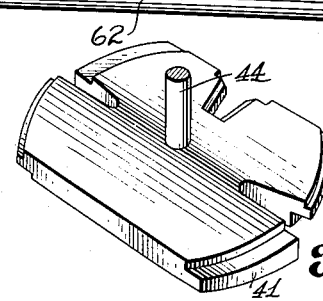
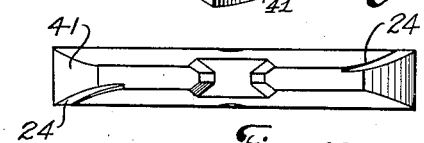
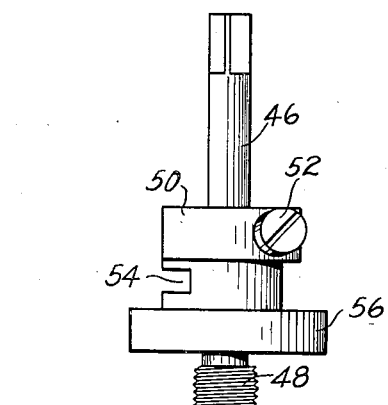
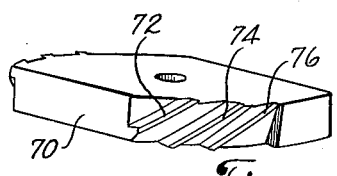
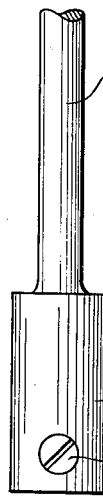
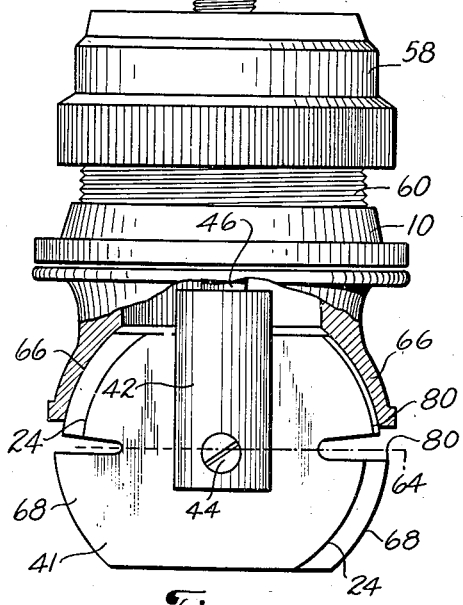
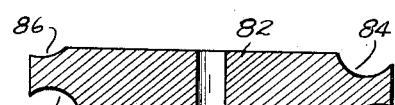
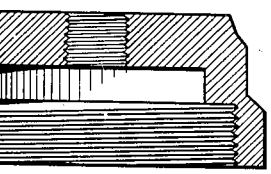
INVENTOR
Roland G. Hawker
BY J. C. Walker
ATTORNEY Patented Mar. 17, 1942

2,276,771

UNITED STATES PATENT OFFICE 2,276,771

FLUSH VALVE SEAT FORMING TOOL

Roland G. Hawker, Kingfield, Maine

Application May 29, 1936, Serial No. 82,535

6 Claims. (Cl. 29—103)

This invention relates to a valve seat trimming device and in more particular to the valve seat trimming tool for a flush valve.

Valve seats for flush valves are made to accommodate a valve having an arcuate surface so that the valve seat may be referred to as a spherical segment, the maximum diameter coinciding with the diameter of the sphere or substantially so. After the valve seat has been used for a longer time, especially where there are impurities in the water, such as lime compounds, which has a tendency to scale upon all metallic surfaces with which the water comes in contact, the valve seat eventually gets rough and irregular so as to cause the same to leak. In the past it has been common practice to replace the old valve seat with a new one whenever the old one leaks.

An object of the present invention is to provide a trimming tool having arcuate trimming surfaces or cutting edges for removing the scale on the worn surface of the valve seat so as to present a new seat lying within a spherical sector or segment.

Another object of this invention is to provide a combination tool having elongated seats disposed intermediate the cutting edges which seats may be used as wrenches while repairing various fixtures.

Another object of this invention is to provide a flexible or yieldable connection intermediate the cutting tool and the adapter therefor.

Another object of this invention is to provide arcuate cutting edges lying in the periphery of a circle, the cutting edges being longer than the width of the flush valve seat.

With the above primary and other incidental objects in view, as will more fully appear in the specification, the invention consists of the features of construction, the parts and combinations thereof, and the mode of operation or their equivalents, as hereinafter described and set forth in the claims.

Fig. 1 discloses a perspective view of my hand operated flush valve seat forming tool cutter in cutting position.

Fig. 6 is a side elevation of the flush valve seat trimming tool used with an adapter for supporting and actuating the cutter in flush valve trimming position.

Fig. 7 shows a suitable actuating mechanism, illustrated by a ratchet wrench.

Fig. 8 shows an extension supporting the cutter for use with a brace.

Fig. 9 is a perspective view of a modified form of cutter.

Fig. 10 is a top plan view of the cutter shown in Fig. 9.

Fig. 11 shows another modification having spiral cutting edges.

Fig. 12 shows a fragmentary end view of the cutter and the adapter.

Fig. 13 is a cross sectional view of the mounting for the adapter.

Fig. 14 is a view of a flush valve seat rim trimming device.

Figure 1:
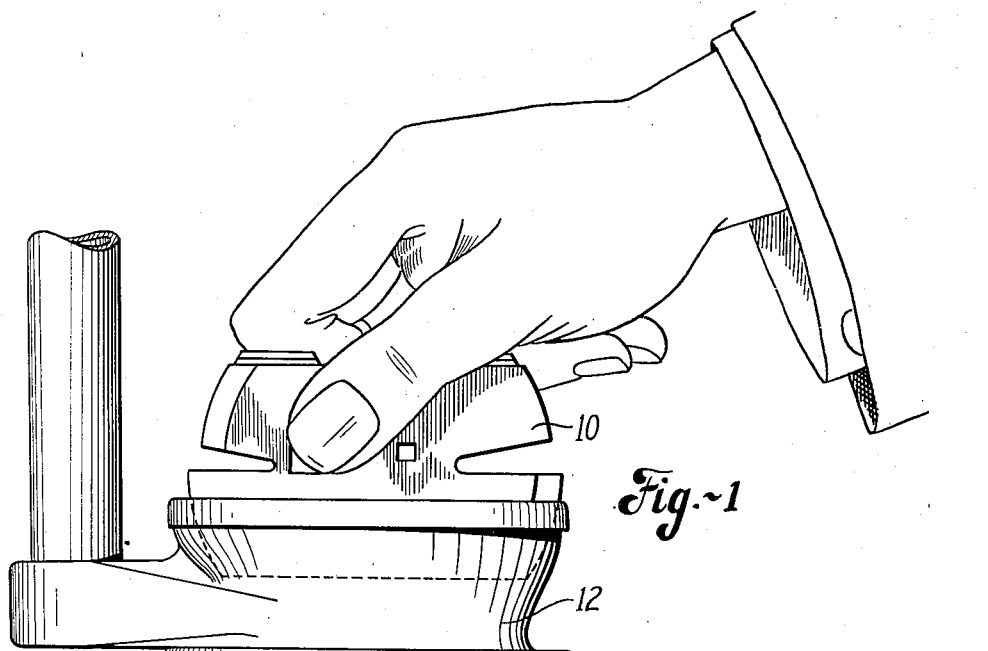
Figure 2:
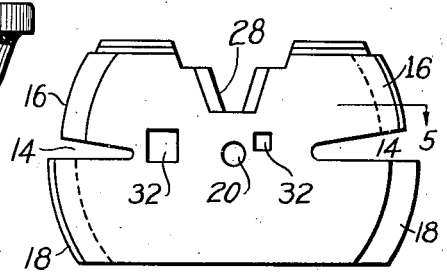
Fig. 2 is a side elevation of the cutter as it appears when removed from the flush valve.

Referring to Fig. 1 the manually operated tool 10 is in trimming position for a flush valve 12 having parts thereof broken away. The manual trimmer 10 may be made from suitable flat stock material provided with a pair of oppositely disposed notches or slots 14 each merging into arcuate cutting edges 16 and 18, all concentric along the axis of the hole 20. The radius of each of the cutting edges 16 is less than the radius of the lower cutting edges 18, whereby the upper portion of the cutter shown in Fig. 2 may be used in trimming a valve seat of a smaller radius than the lower portion.

Figure 3:
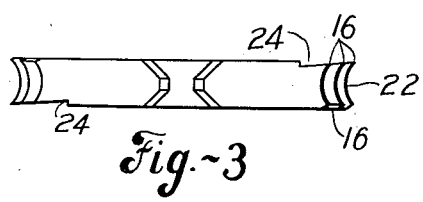
Fig. 3 is a top plan view of the cutter as seen when looking down from the top of Fig. 2.
Figure 5:
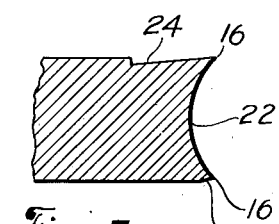
Fig. 5 is a vertical sectional view taken substantially on the line 5—5 of Fig. 2.

The valve seat of flush valves is usually arranged to lie on the surface of the sphere or ball. That being the case, the cutting edges 16 and the cutting edges 18 respectively are arranged to trim a portion of a spherical surface. The cutting edges 16 on each side, as best seen in Figs. 3 and 5, are spaced from each other by a hollow ground surface 22. For the purpose of illustration, if ⅜" stock is used, the radius of the hollow ground surface 22 may be ½". The width of the cutter stock material may be altered to meet the particular demands.

From this it is apparent that the cutter when in trimming position is supported on all four edges, two of which constitute the cutting edges and the other two supporting heels when rotated in one direction. The cutting edges and supporting heels are reversed when the direction of rotation is reversed. The cutter has a four point suspension. This provides for steadiness and ease in manipulating the cutter. If the cutter is not held along the axis of the valve seat, that is, if it is tilted slightly, it has a natural tendency to gravitate into a plane coincident with the axis of the valve seat.

This tool cuts when rotated in either direction and is chamfered or beveled off at different angles for both free cutting when turned in one direction and fine smooth cutting or scraping when turned in the opposite direction. The cutter supports on the flush valve along four lines or edges of contact.

As seen in Fig. 3, and enlarged upon in Fig. 5, opposite sides of the cutter are hollow ground at 24, so as to provide a very sharp cutting edge readily penetrating the material when the cutter is rotated in one direction, as viewed in Fig. 3. As best seen in Fig. 5, the opposite edge is chamfered along the small angle, say 10°, as shown at 26, so as to present a finishing or smoothing cutting edge. Thus, it will be seen that if the manually operable cutter is rotated in one direction it cuts into the metal very freely and makes a deep cut, whereas, if the cutter is rotated in the opposite direction a fine cut is made, leaving a smooth surface which may be referred to as a finishing surface.

Figure 4:
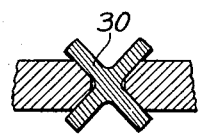
Fig. 4 is another top plan view showing an end view of a valve seat trimming tool in section engaged by my trimming tool which functions as a wrench.

A V-shaped notch 28 is disposed medially between the cutting edges 16, which may be used for removably attaching the cutter to an actuating means. In the sectional view shown in Fig. 4, the flanges of the trimming tool have been designated by the reference character 30.

The notches 14 and the square holes 32 may be used as wrenches in actuating taps during the repair job.

The cutting edge for the hand tool to be operated by hand pressure to scrape the metal as a hand scraper would scrape must necessarily have a fine, thin, keen edge, directly against the work, so that it may be sensitive enough to take hold or to take a cut with a limited amount of pressure applied by the hand of the operator to the tool.

If instead of operating the tool manually, mechanical pressure is applied against this same edge, such as can be easily applied if a tool is operated with the leverage and pressure which can be applied when used with a brace in an extension 40 shown in Fig. 8. Then this same edge, which is a success when used by hand, may be a failure under this heavy cutting pressure, because this heavy pressure is sufficient to force this edge directly into the metal deep enough so that instead of taking the bite when the tool is turned, it jumps out of the bite, because while there is pressure enough to cause this fine edge to take in under pressure, the depth it takes in may be too great for the pressure to hold it down on the turn. Consequently, the tool on the turn may climb out of where it has dug in, only to dig in again and again, repeating continuously on the turn, chewing the metal on the seat and producing a rough surface of continuous ruffles or waves.

This chattering or fluttering cutting action may be multiplied due to the fact that the flush valve being worked upon is not always held on a solid foundation. The flush valve usually is in a closet tank mounted as a rule on a thick resilient rubber gasket, which is used under the flush valve in connecting it to the closet tank, to make a water tight connection on the rough surface in the bottom of the closet tank.

Therefore, if an adapter or an extension is to be used, it is desirable to provide a cutter wherein the cutting edge does not cut in quite as freely as when a hand operated tool is used.

Referring to the modification disclosed in Fig. 6, a cutter 41, which will be more fully described later, is mounted in a bifurcated member 42 and held in position by a screw 44. The bifurcated member 42 is fixedly attached to a cutter stem 46, rotatably mounted in a sleeve 48, provided with a smooth bore which affords an extended guiding bearing for the stem 46. The cutter stem 46 is loosely mounted in the sleeve 48 for revoluble adjustment. Fixedly secured upon the stem 46 is an abutment collar 50, which in the present instance is identical to the abutment collar disclosed in my Patent No. 1,993,479 patented March 5, 1935, and is provided with a clamp screw 52, by which it is contracted tightly upon the stem.

The under side of the abutment collar 50 is provided with a slot 54 in which the upper end of the bearing and feeding sleeve 48 is provided with a peripheral flange or head engageable within the undercut slot of the abutment collar 50, into which it is slidable laterally prior to the insertion of the cutter stem 46, as more fully disclosed in my Patent No. 1,993,479. Thus, the bearing and feeding sleeve 48 is freely rotatable about the shaft 12 and within the undercut slot 54 of the abutment collar and likewise the shaft or stem 46 is freely rotatable therewithin. The sleeve 48 has a longitudinal thrust bearing upon the abutment collar 50 during the reseating or reaming operation. The sleeve 48 is further provided with an enlarged core or head 56 preferably peripherally knurled by which the sleeve is manually revoluble.

The sleeve 48 is provided with external threads, threadedly engaging a threaded bore in member 58 having suitable threads engaging the threads 60 of the flush valve 10. Being screw threaded within the threaded bore of member 58, the rotation of the sleeve 48 by engagement of its flanged head within the undercut slot 54 of the abutment collar 50, serves to longitudinally advance the cutter stem or shaft 46. As a comparatively large surface may be cut when a heavy pressure is exerted upon the cutter 41, a ratchet wrench 62 may be used to rotate the stem 46 and with it the cutter 41.

The body of the cutter 41 tapers from the medial plane designated by the dotted line 64 in Fig. 6 to either end as shown in Fig. 9. Thus, the cutting edges 66 and 68 have a slicing effect when cutting the material. These cutting edges are the equivalent of spiral cutting edges. Opposite cutting edges are hollow ground at 24 much the same as the modification disclosed in Figs. 1 to 5.

In Fig. 11 a cutter 70 has been shown, wherein several spiral cutting teeth 72, 74 and 76 have been shown, wherein the cutting edges on one side of the teeth are roughing cutting edges and the cutting edges on the opposite side of the teeth are finishing or smoothing edges. Thus, the spiral cutter shown in Fig. 11 is provided with roughing cutting edges or fast free cutting edges when rotated in one direction and a finishing or smoothing cutting edge when turned in the opposite direction. In this modification all cutting is done on an angle with respect to the general direction of rotation.

Again referring to Fig. 1 where the flush valve seat has been shown with parts broken away and Fig. 6 where the flush valve has been shown in dotted line, the cutting edges are considerably longer than the width of the seat. This allows for slight orientation of the cutters without the corners gouging into the valve seat so as to produce furrows.

In Fig. 14 a trimmer 82 for trimming the top edges of the flush valve seats has been shown. It has two pairs of cutting edges 84 and two pairs 86, the one pair of cutting edges for use with a flush valve seat of one size and the other for another size. One pair of edges constitutes a roughing or fast free cutting tool when rotated in one direction and the other pair a slow smoothing or finishing cutting tool when rotated in the opposite direction. This cutter rounds the top edge of the flush valve seat to prevent the tank ball from sitting on the top edge of the flush valve when it comes down crooked which sometimes happens when old guide arms are not replaced on the flush valve. At times these old guide arms are so badly worn and are so cheaply constructed and so crude that they allow the tank bulb to come down at any old angle, largely influenced by the water pressure entering the water tank.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A trimming device for a frusto-spherical valve seat, including a plate-like member positionable normal to and diametrically of the valve seat for rotation about the longitudinal axis of the seat and having its ends concentrically curved to substantially agree with the contour of the seat, and two pairs of diametrically opposite cutting edges disposed in diagonal planes on the plate-like member, the cutting edges of each pair being curved coincident with the ends of the member and chamfered to a degree different from that of the cutting edges of the other pair for different cutting actions, and the cutting edges of each pair being inclined with respect to the transverse plane of the member.

2. A trimming device for a frusto-spherical valve seat, including a plate-like member positionable normal to and diametrically of the valve seat for rotation about the longitudinal axis of the seat and having its ends concentrically curved to substantially agree with the contour of the seat, and two pairs of diametrically opposite cutting edges disposed in diagonal planes on the plate-like member, the cutting edges of each pair being curved coincident with the ends of the member and chamfered to a degree different from that of the cutting edges of the other pair and oppositely thereto for different cutting actions, and the cutting edges of each pair being inclined with respect to the transverse plane of the member and oppositely inclined with respect to each other.

3. A reversible trimming device for a frusto-spherical valve seat, including a plate-like member positionable diametrically of the valve seat for rotation about the longitudinal axis of the seat and having its ends concentrically curved to substantially agree with the contour of the seat, the curvature of the upper end of the edges of the plate-like member above the horizontal medial plane thereof being of different radius than the curvature of the edges below the horizontal medial plane of the plate-like member, both the upper and lower portions of the plate-like member having two pairs of diametrically opposite cutting edges disposed in diagonal planes on the plate-like member and curved coincidently with the ends of the plate-like member, each pair of cutting edges being disposed angularly with respect to the vertical plane of the member, and that portion of the plate-like member of which the cutting edges are not in contact with the valve seat providing a gripping portion for rotation of the plate-like member about the longitudinal axis of the valve seat.

4. A valve seat cutter of generally flat wedge form and having two flat wedge-forming faces lying in intersecting planes symmetrically located on opposite sides of a central axis, and also having two curved ends each provided with two cutting edges formed of circular arcs of a common radius and having a common center located in the central axis, one cutting edge on one end and one cutting edge on the other end constituting one pair of cutting edges, and the remaining cutting edges constituting a second pair of cutting edges, said cutting edges and flat faces being relatively so positioned that if the respective arcs of each pair be joined so as to form two continuous arcs, those continuous arcs will intersect each other in a point lying in the line of intersection of the said intersecting planes.

5. A valve seat cutter of generally flat wedge form and having two flat wedge-forming faces lying in intersecting planes symmetrically located on opposite sides of a central axis, and also having two curved ends each provided with two cutting edges formed of circular arcs of a common radius and having a common center located in the central axis, one cutting edge on one end and one cutting edge on the other end constituting one pair of cutting edges, and the remaining cutting edges constituting a second pair of cutting edges, said cutting edges and flat faces being relatively so positioned that if the respective arcs of each pair be joined so as to form two continuous arcs, those continuous arcs will intersect each other in a point lying in the central axis.

6. A valve seat cutter of generally flat wedge form and having two flat wedge-forming faces lying in intersecting planes symmetrically located on opposite sides of a central axis, and also having two curved ends each provided with two cutting edges formed of circular arcs of a common radius and having a common center located in the central axis, one cutting edge on one end and one cutting edge on the other end constituting one pair of cutting edges, and the remaining cutting edges constituting a second pair of cutting edges, said cutting edges and flat faces being relatively so positioned that if the respective arcs of each pair be joined so as to form two continuous arcs, those continuous arcs will intersect each other in a point lying both in the line of intersection of the said intersecting planes and in the central axis.

ROLAND G. HAWKER.